UNITED STATES PATENT OFFICE.

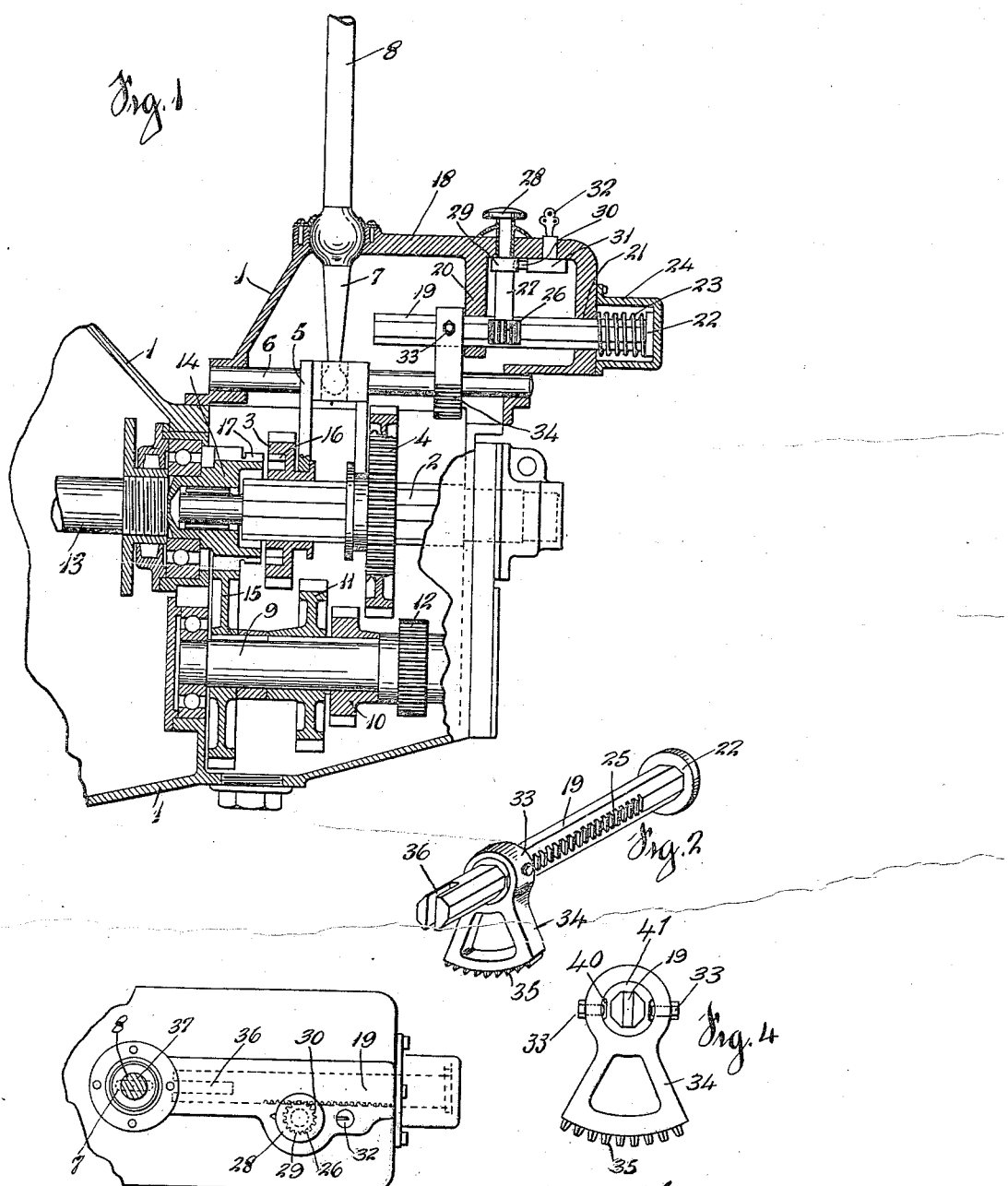

LOUIS C. RITTMEYER, OF ST. BERNARD, OHIO.

AUTOMOBILE-LOCKING DEVICE.

1,266,159.　　　　　Specification of Letters Patent.　　Patented May 14, 1918.

Application filed September 20, 1917. Serial No. 192,386.

*To all whom it may concern:*

Be it known that I, LOUIS C. RITTMEYER, a citizen of the United States, and a resident of St. Bernard, in the county of Hamilton and State of Ohio, have invented certain new and useful Improvements in Automobile-Locking Devices, of which the following is a full, clear, and exact description, reference being had to the accompanying drawing, forming part of this specification.

My invention relates to locks to prevent the unauthorized use of an automobile or tractor, and the especial object of my invention is to provide a lock which shall secure the rear driven wheels of the machine so as to effectually prevent the towing of the car or any movement of same when the lock is in use.

Heretofore it has been usual to apply the lock to the clutch or gear shifting levers, or some other part of the car without locking the driven carrying wheels of the machine so that while still locked the car can be pushed or towed away from the location at which it has been left. Or if any effort has been made to lock the driven carrying wheels, such lock has been so applied that the starting of the engine when the car is locked must necessarily result in the breaking of some of the parts.

My invention is therefore directed to the locking of the transmission mechanism instead of the engine mechanism, so that the driven wheels shall also be locked, and in this connection I provide that when locked the transmission mechanism shall not be damaged should the engine be started while the lock is in use.

The invention consists of that certain novel construction and arrangement of parts to be hereinafter particularly pointed out and claimed whereby the above results are attained.

In the drawing,

Figure 1 is a longitudinal section of the transmission gearing of the ordinary construction for use in automobiles, with my improved lock applied thereto.

Fig. 2 is a perspective view of the locking device.

Fig. 3 is a plan view of same.

Fig. 4 is an end view of same.

The gear casing of the ordinary transmission gearing is represented by 1, within which is mounted the main transmission shaft 2 carrying the two change speed gears 3, 4, which are keyed to the shaft and slidably mounted thereon so as to be shifted in either direction by collar shifting device 5, which is mounted to slide on the rod 6 under control of the gear shifting lever 7, with its handle 8 extending up into the path of the car for the use of the driver. Mounted alongside of and parallel to the main shaft is the countershaft 9 which carries the sets of gears for the various speeds, as usually constructed the gear 10 being for the first speed, 11 for the second speed, and 12 for reverse.

The main shaft 2 is connected directly with the rear axle for driving the rear wheels and fits loosely in the driving shaft 13 from the engine, and upon this driving shaft the clutch devices are mounted for coupling the shaft 13 with the engine. Secured on this shaft inside the transmission casing is the gear 14 which remains constantly in mesh with the gear 15 on the countershaft. For high speeds, the change of speed gear 3 is provided with internal teeth 16 to mesh directly with the teeth 17 on the gear 14. It will be understood that the reversing gear 12 is in mesh with another gear (not shown) for the purpose of giving reverse movement, and that all of the gears on the countershaft 9 are fixed thereon so as to turn with the countershaft, and that with this ordinary construction of transmission gear when the clutch of the engine driving shaft is thrown in so as to drive the shaft 13, that the gears on the countershaft will all rotate, and that the main driving shaft to the rear axle is coupled to any selected gear on the countershaft, or to the high speed gear on the engine shaft through the slidable speed change gears 3 and 4.

My improved lock is applied to either of the change of speed gears 3, 4, without in any way affecting the gears on the countershaft or the gear 14, so that the locking of the speed change gears against movement will also lock the rear wheels from movement, without any danger of destroying the mechanism, should the engine be started while the lock is in use.

To accomplish this end, I open up the transmission gear casing and provide a section of casing 18 on which my locking device is mounted. The locking device comprises a fixed shaft 19, of some polygonal shape in cross section, preferably as I have illustrated hexagonal in cross section. This shaft is slidably mounted in a bearing 20 depending from the casing 18 and in the side of the casing at 21, and the shaft is provided with a collar 22 on its outer end, with a coiled spring 23 bearing between the collar and the outside of the casing so as normally to keep the shaft pressed outwardly. This protruding end of the lock shaft 19 is provided with a protected cap 24. On the lock shaft 19, I provide a rack 25, which is engaged by a pinion 26 on the lower end of spindle 27 which projects through the casing 18 and into the bottom of the car, and is provided with a knurled head 28. The spindle 27 carries a notched collar 29, and the notch in this collar is engaged by a latch 30 of a Yale or other key-lock 31, which is operated by a key 32. Mounted on the shaft 19 is a segment gear 34, provided with teeth 35 to engage the gear 4, which gear I have selected to lock, as it is the larger of the two speed change gears, although of course it will be understood that the locking gear can be arranged to engage the other speed change gear if desired. In order to insure interlocking of the segment with the gear 4, I bevel the teeth at the contacting edge and I mount the locking member on a collar 41 by means of set screws 33, which take into elongated grooves 40 in the collar so as to allow rotary play of the gear on the collar, while the collar is fitted and secured on the shaft 19.

In order that it shall not be possible to shift the speed change operating lever when the car is locked, and also to provide that the lock cannot be operated except when the change of speed lever is in neutral, and the change of speed gears out of mesh, I locate the lock shaft 19 in line with the lower end of the lever 7 and form a slot 36 in the inner end of the shaft 19, arranged so that the forks of the shaft formed by the slot shall engage over the flat portion 37 (Fig. 3) of the lever 7, and so that when this lever is in any position except the neutral one the shaft 19 will strike against the lever and be stopped from throwing the locking gear 34 into mesh with the gear 4.

The operation of the lock will be obvious from the foregoing description. With the change of speed lever 8 in neutral position, the speed change gears will be out of mesh with the gears on the countershaft, and to lock the machine the operator turns the knurled head 28 to shift the locking shaft 19 so that the segment gear 34 will engage the change of speed gear 4. At the same time the shaft 19 by its bifurcated end will engage the transmission lever, and the lever and main shaft 2 will be locked from movement. In this position, the notch in the collar 29 is engaged by the latch 30 of the Yale or other lock, and the key being withdrawn, the main shaft and driving wheels are securely locked without, however, preventing the starting of the engine and throwing in the clutch. Such action would do no damage, as the speed change gears are not in mesh with the gears on the countershaft.

Of course the location of the change of speed lever may be such that it will be necessary to provide an extension of the locking shaft 19 with a bifurcated end instead of merely slotting the shaft. Moreover, as I have heretofore indicated, it will be evident that the parts can be readily rearranged so that the locking segment could be thrown into engagement with the other change of speed gear 3. When it is desired to release the lock, as soon as the latch 30 is thrown out of engagement with the notch in the collar 29, the spring 23 will shift the locking shaft 19 outwardly and disconnect the locking segment from the change of speed gear, so that the gear will be ready for normal driving

Having thus described my invention, what I claim as new and desire to secure by Letters Patent, is:—

1. In a device of the character specified, the combination with the main shaft to the driving wheels and gearing rotating therewith, of a nonrotatable movable locking member, and means for shifting the same to engage the main shaft gearing to lock the shaft from rotation.

2. In a device of the character specified, the combination with the main shaft to the driving wheels and gearing rotating therewith, of a nonrotatable slidable locking member, and means for shifting the same to engage the main shaft gearing to lock the shaft from rotation.

3. In a device of the character specified, the combination with the main shaft to the driving wheels and gearing rotating therewith, said gearing being movable on the main shaft for changing speed and means for moving same, of a nonrotatable movable locking member, and means for shifting the same to engage the main shaft gearing to lock the shaft from rotation, said locking member being arranged to lock the gear shifting means in neutral position.

4. In a device of the character specified, the combination with the main shaft to the driving wheels and gearing rotating therewith, said gearing being movable on the main shaft for changing speed and means for moving same, of a nonrotatable slidable locking member, and means for shifting the same to engage the main shaft gearing to lock the shaft from rotation, said locking means being arranged to lock the gear shifting means in neutral position.

5. In a device of the character specified, the combination with the engine shaft, the main driving shaft and a countershaft and a change of speed transmission device, comprising counter shaft gears in connection with the engine shaft and change of speed gears on the main driving shaft, of a nonrotatable movable locking member and means for shifting same to engage a change of speed gear to lock the main shaft from rotation.

6. In a device of the character specified, the combination with the engine shaft, the main driving shaft and a countershaft and a change of speed transmission device, comprising countershaft gears in connection with the engine shaft and change of speed gears on the main driving shaft, with lever for shifting same, of a nonrotatable movable locking member and means for shifting same to engage a change of speed gear to lock the main shaft from rotation, with means in connection with the locking member to engage the shifting lever when in neutral position and to lock the same from movement.

7. In a lock for an automobile transmission mechanism comprising shiftable change of speed gears, a slidable nonrotatable rod, with segment gear thereon adapted to engage a change of speed gear, a rack and pinion for shifting said rod to bring said change of speed gear and segment gear into mesh, and a keylock to engage said shifting means to lock the segment gear in mesh.

8. In a lock for an automobile transmission mechanism comprising shiftable change of speed gears, with a lever for operating the same, a slidable nonrotatable rod, with segment gear thereon adapted to engage a change of speed gear, a rack and pinion for shifting said rod to bring said change of speed gear and segment gear into mesh, and a keylock to engage said shifting means to lock the segment gear in mesh, with means on the rod to engage the transmission operating lever when the same is in neutral position to lock said transmission lever in said position.

9. In a lock for an automobile transmission mechanism comprising shiftable change of speed gears, with a lever for operating the same, a slidable nonrotatable rod, with segment gear thereon adapted to engage a change of speed gear, a rack and pinion for shifting said rod to bring said change of speed gear and segment gear into mesh, and a keylock to engage said shifting means to lock the segment gear in mesh, with means on the rod to engage the transmission operating lever when the same is in neutral position to lock said transmission lever in said position, said lever also acting as a stop for the locking rod to prevent shifting the same when not in neutral position.

LOUIS C. RITTMEYER.